(12) United States Patent
Snelten

(10) Patent No.: US 8,400,135 B2
(45) Date of Patent: Mar. 19, 2013

(54) SELF-OSCILLATING SWITCH CIRCUIT AND A DRIVER CIRCUIT COMPRISING SUCH A SWITCH CIRCUIT

(75) Inventor: Jeroen Snelten, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 728 days.

(21) Appl. No.: 12/596,858

(22) PCT Filed: Apr. 22, 2008

(86) PCT No.: PCT/IB2008/051543
§ 371 (c)(1),
(2), (4) Date: Oct. 21, 2009

(87) PCT Pub. No.: WO2008/132658
PCT Pub. Date: Nov. 6, 2008

(65) Prior Publication Data
US 2010/0127641 A1    May 27, 2010

(30) Foreign Application Priority Data
Apr. 27, 2007    (EP) .................................. 07107154

(51) Int. Cl.
*G05F 3/00* (2006.01)
(52) U.S. Cl. ........ 323/304; 323/265; 323/282; 323/312; 323/266
(58) Field of Classification Search .................. 363/265, 363/266, 271, 272, 282, 285, 311–316, 349–354; 323/265, 266, 271, 272, 282, 285, 311–316, 323/349–354
See application file for complete search history.

(56) References Cited

U.S. PATENT DOCUMENTS

| 3,987,424 A | 10/1976 | Brouwer et al. |
| 4,030,024 A | 6/1977 | Chambers et al. |

(Continued)

FOREIGN PATENT DOCUMENTS

| EP | 1043189 A2 | 10/2000 |
| JP | 09207662 A1 | 8/1997 |
| WO | 9913559 A2 | 3/1999 |

OTHER PUBLICATIONS

Ossman: "Small DC-DC Converters:DC-DC Converters Under the Magnifying Glass"; Elektor Electronics, vol. 29, No. 317, Jan. 1, 2003, pp. 54-58.

*Primary Examiner* — Tuyet Thi Vo
(74) *Attorney, Agent, or Firm* — Mark L. Beloborodov

(57) ABSTRACT

A self-oscillating switch circuit is configured for use in a switching DC-DC converter (switched mode power supply (SMPS)). The self-oscillating switch circuit comprises an input terminal (Tin1, Tin2) for receiving power from a power supply (51) and an output terminal (Tont1, Tont2) for supplying power to a load. The load may be a high-power LED, for example. The self-oscillating switch circuit further comprises a power switch semi-> conductor device (Q1) having a control terminal and a control semi-conductor device (Q2) coupled to the power switch semi-conductor device. The power switch semi-conductor device is configured for controlling a load current between the input terminal and the output terminal and the control semi-conductor device is configured for supplying a control signal to the control terminal of the power switch semi-conductor device for controlling switching of the power switch semi-conductor device. In order to reduce a power loss in the power switch semi-conductor device, a gain semi-conductor device (Q4) is coupled between the power switch semi-conductor device and the control semi-conductor device for amplifying the control signal. Due to the amplification of the control signal, switching of the power switch semi-conductor device is performed faster, thereby reducing power dissipation due to a load current flowing through the power switch semi-conductor device, while the base-emitter voltage of the power switch transistor is below a base emitter voltage corresponding to the peak current at that time.

19 Claims, 4 Drawing Sheets

U.S. PATENT DOCUMENTS

| | | |
|---|---|---|
| 5,180,964 A | 1/1993 | Ewing |
| 6,239,585 B1 | 5/2001 | Buono |
| 6,873,111 B2 | 3/2005 | Ito et al. |
| 7,129,856 B2 | 10/2006 | Hering et al. |
| 2005/0200574 A1 | 9/2005 | Goto et al. |
| 2005/0231127 A1 | 10/2005 | Yamamoto et al. |
| 2005/0265039 A1 | 12/2005 | Lodhie et al. |
| 2011/0026278 A1* | 2/2011 | Yin .......................... 363/21.15 |

* cited by examiner

SELF-OSCILLATING SWITCH CIRCUIT AND A DRIVER CIRCUIT COMPRISING SUCH A SWITCH CIRCUIT

FIELD OF THE INVENTION

The present invention relates to a self-oscillating switch circuit for use in a switching DC-DC converter. Further, the present invention relates to a driver circuit for operating a load, the driver circuit comprising the self-oscillating switch circuit. In particular, the driver circuit is configured for driving a LED.

BACKGROUND OF THE INVENTION

In a known device comprising a LED or an OLED, an electronic switching driver is applied to provide a suitable load current to the (O)LED. Such a device may be a LCD display having a (O)LED backlight, an automotive light assembly, e.g. a rear combination light (RCL) or any other lighting device. Such an electronic switching driver is in general preferably a low-cost circuit.

A suitable low-cost switching driver circuit may be a known self-oscillating driver circuit. Such a switching driver circuit comprises a self-oscillating switch circuit. A disadvantage of the known self-oscillating switch circuit is a limited efficiency. In particular, a power switch transistor is gradually switched off, while a load current flows through the power switch transistor. Consequently, during the period of being switched off, power is dissipated in the power switch transistor. Such power is lost, resulting in a relatively low efficiency. Moreover, due to the power dissipation in the power switch transistor, only a limited load current may be applied in order to prevent damage to the power switch transistor.

OBJECT OF THE INVENTION

It is an object of the present invention to provide a low-cost switching DC-DC converter for driving a load, in particular a LED.

SUMMARY OF THE INVENTION

The above object is achieved in a self-oscillating switch circuit according to claim 1 and a load driver circuit according to claim 11.

According to the present invention, a self-oscillating switch circuit for use in a switching DC-DC converter comprises an input terminal for receiving power from a power supply and an output terminal for supplying power to a load. A power switch semi-conductor device having a control terminal, such as a transistor, is provided and configured for controlling a load current flowing between the input terminal and the output terminal. Further a control semi-conductor device is provided and coupled to the power switch semi-conductor device for supplying a control signal to the control terminal of the power switch semi-conductor device for controlling switching of the power switch semi-conductor device. Further, a gain semi-conductor device is provided and coupled between the power switch semi-conductor device and the control transistor for amplifying the control signal.

In the above-mentioned prior art, the gradual process of off-switching of the power switch semi-conductor device is caused by a gradual increase of the control signal provided by the control semi-conductor device. In accordance with the present invention, a gain semi-conductor device is coupled between the control device and the power switch device in order to amplify the control signal. Due to the amplified control signal, the power switch device switches faster and less power is dissipated. The lowered power dissipation results in a higher power efficiency and enables to use a higher load current without damaging the power switch device.

One or more of the semi-conductor devices may be a transistor, in particular a bipolar transistor or a field-effect transistor (FET), or any other suitable semi-conductor device.

The load current flows through the power switch semi-conductor device from a power-switch input terminal to a power-switch output terminal. In an embodiment a capacitor is coupled between said power-switch input terminal and said power-switch output terminal. As a result, a voltage over the semi-conductor device and/or a current through the semi-conductor device is delayed, when the control semi-conductor device is switched. Thereby, the power loss due to switching is reduced further.

In an embodiment, the control semi-conductor device is a first control semi-conductor device for switching the power switch semi-conductor device non-conductive. Further, in this embodiment, the self-oscillating switch circuit comprises a second control semi-conductor device coupled to the control terminal of the power switch semi-conductor device for switching the power switch semi-conductor device conductive. A pulse width modulation, PWM, circuit is coupled between the power switch semi-conductor device and the second control semi-conductor device. The PWM circuit comprises a PWM signal input terminal for receiving a PWM signal. Supplying a suitable PWM signal to the PWM signal input terminal enables to drive the load in a PWM mode. Thus, if the load is a lighting device such as a LED, the LED may be dimmed by pulse width modulation. Such an embodiment is in particular suitable for use with an automotive rear combination light. For example, a tail light and a break light may be combined. If the LED is used as a tail light, a PWM mode may be used to obtain a reduced light output, for example, using a 10% duty cycle PWM signal. If the LED is used as a break light, the duty cycle may be increased, e.g. up to 100% resulting in a maximum light output.

In a further embodiment, the PWM circuit comprises a series connection of a PWM circuit resistor and a parallel connection of a PWM circuit capacitor and a PWM circuit diode, wherein the PWM circuit capacitor is configured for increasing a control signal supplied to the second control semi-conductor device, when the power switch semi-conductor device starts to conduct. Increasing the control signal to the second control semi-conductor device results in an increased control signal from the second control semi-conductor device to the power switch semi-conductor device and consequently to a faster switching of the power switch device. Faster switching results in less power dissipation and a shorter switch on delay.

In an embodiment, a buffer semi-conductor device is coupled between the PWM signal input terminal and a common terminal of the circuit and a PWM signal generator is coupled to a control terminal of the buffer semi-conductor device. The buffer semi-conductor device may be a transistor, for example. In this embodiment, the buffer device allows use of an internal or an external PWM generator.

In a further embodiment, a controllable switch element is coupled between the control terminal of the buffer semi-conductor device and the common terminal. The controllable switch element, such as a transistor, is configured for switching the buffer semi-conductor device non-conductive, when the controllable switch element is switched conductive. Thus, the buffer device is switched non-conductive independent from the PWM signal, thereby disabling the PWM signal.

In an embodiment, a start-up circuit is coupled between the input terminal and the control terminal of the second control semi-conductor device. The start-up circuit comprises a zener diode coupled to a common terminal and the input terminal to provide the start-up current in a way that no DC offset current will be present in the load current.

The present invention further provides a load driver circuit for operating a load. The load driver circuit comprises a switching DC-DC converter circuit. The switching DC-DC converter comprises a self-oscillating switch circuit according to the present invention. In an embodiment, the switching DC-DC converter is selected from a group comprising a buck converter, a boost converter, a buck-boost converter and a flyback converter and other converter topologies. In an embodiment, the load is a light emitting diode, LED.

BRIEF DESCRIPTION OF THE DRAWINGS

Hereinafter, the present invention is elucidated with reference to the appended drawings showing non-limiting embodiments and wherein.

DETAILED DESCRIPTION OF EXAMPLES

Figure 1:
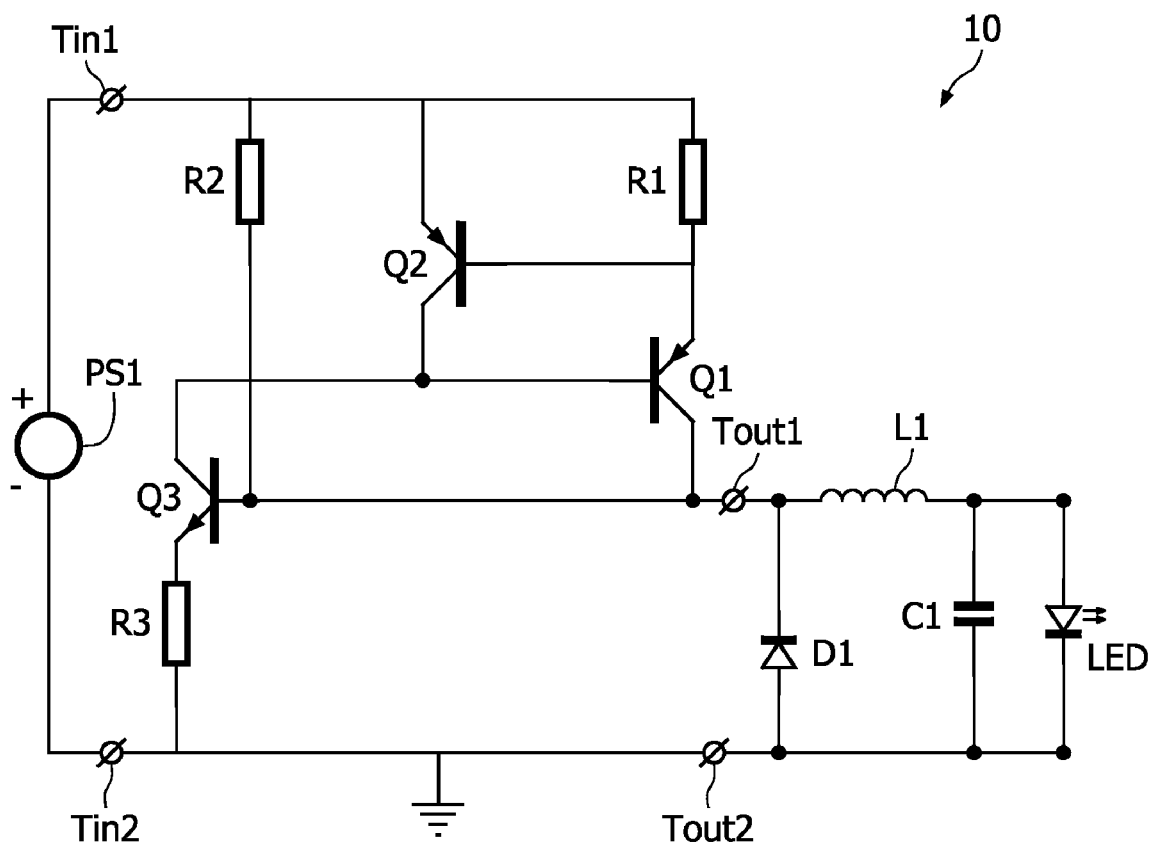
FIG. 1 shows a circuit diagram of a prior art self-oscillating switching DC-DC converter.

In the drawings, same reference numerals refer to same elements. FIG. 1 shows a circuit diagram of a prior art self-oscillating switch circuit comprised in a switching DC-DC buck converter 10. The self-oscillating switch circuit comprises a first and a second input terminal Tin1, Tin2. A DC power supply PS1 is coupled to the input terminals Tin1, Tin2 for supplying a DC voltage to the buck converter 10. The Dc power supply PS1 may be any kind of DC power supply, including a battery (pack). A light emitting diode LED is coupled to an output of the buck converter 10. The buck converter 10 further comprises an output inductor L1, an output capacitor C1 and a freewheel diode D1. The output capacitor C1 is coupled in parallel to the LED. The output inductor L1 is coupled in series with said parallel circuit of the output capacitor C1 and the LED. The freewheel diode D1 is connected in parallel to said series connection and the freewheel diode D1 is connected between a first and a second output terminal Tout1, Tout2 of the self-oscillating switch circuit.

The self-oscillating switch circuit comprises a power switch semi-conductor device, in particular a bipolar power switch transistor Q1. A collector of the power switch transistor Q1 is connected to the first output terminal Tout1 and an emitter of the power switch transistor Q1 is coupled via a sensing resistor R1 to the first input terminal Tin1 such that the power switch transistor Q1 is configured for controlling a load peak current between the input terminal Tin1 and the output terminal Tout1.

The self-oscillating switch circuit further comprises a first control semi-conductor device, in particular a first bipolar control transistor Q2. A base terminal, i.e. a control terminal, of the power switch transistor Q1 is coupled to a collector of the first control transistor Q2. An emitter of the first control transistor Q2 is coupled to the first input terminal Tin1. The base terminal of the first control transistor Q2 is coupled to the emitter of the power switch transistor Q1.

The self-oscillating switch circuit further comprises a second control semi-conductor device, in particular a second bipolar control transistor Q3. A collector of the second control transistor Q3 is coupled to the base terminal of the power switch transistor Q1 and the collector of the first control transistor Q2. An emitter of the second control transistor Q3 is coupled via a current-limiting resistor R3 to the second input terminal Tin2 and the second output terminal Tout2, which are all connected to ground and thus function as a common terminal of the circuit. A base terminal of the second control transistor Q3, i.e. a control terminal thereof, is connected to the first input terminal Tin1 via a start-up resistor R2 and is connected to the collector of the power switch transistor Q1 and is connected to the first output terminal Tout1.

In operation, at start-up, a DC supply voltage is supplied by the power supply PS1 to the first and second input terminals Tin1, Tin2. The supplied DC voltage is applied to the base terminal of the second control transistor Q3 through the start-up resistor R2. As a result, the second control transistor Q3 is switched conductive. As a result, a collector current is generated and the power switch transistor Q1 becomes conductive. A load current is then enabled to flow from the first input terminal Tin1, through the sensing resistor R1, the power switch transistor Q1 and the output inductor L1 to the output capacitor C1 and the LED. Due to the inductor L1, the load current gradually increases.

With the increasing load current, an increasing voltage is generated over the sensing resistor R1. This increasing voltage results in an increasing base-emitter voltage on the first control transistor Q2. With the increasing base-emitter voltage, the first control transistor Q2 gradually becomes conductive, thereby gradually lowering a base-emitter voltage of the power switch transistor Q1. As the load current is flowing through the power switch transistor Q1, power is dissipated in the power switch transistor Q1, when the base-emitter voltage of the power switch transistor Q1 becomes below the base emitter voltage corresponding to the peak current at that time. Eventually, the power switch transistor Q1 becomes non-conductive and the load current is blocked.

In the meantime, the inductor L1 maintains its current and a current starts to flow through the LED and the freewheel diode D1. As a result, a negative voltage is generated at the cathode of the freewheel diode D1, thereby switching the second control transistor Q3 non-conductive. When the current becomes too low and the freewheel diode D1 is switched non-conductive, removing the negative voltage at the base terminal of the second control transistor Q3. Subsequently, the supplied DC voltage from the first input terminal Tin1 is applied at the base terminal of the second control transistor Q3 and the above-described process is repeated thus providing self-oscillation.

As mentioned above, power is dissipated in the power switch transistor Q1 due to the relatively slowly increasing control signal supplied from the collector of the first control transistor Q2 to the base terminal of the power switch transistor Q1. A faster increasing control signal would result in faster switching and thus in less power dissipation. Less power dissipation would allow a higher load current.

Figure 2:
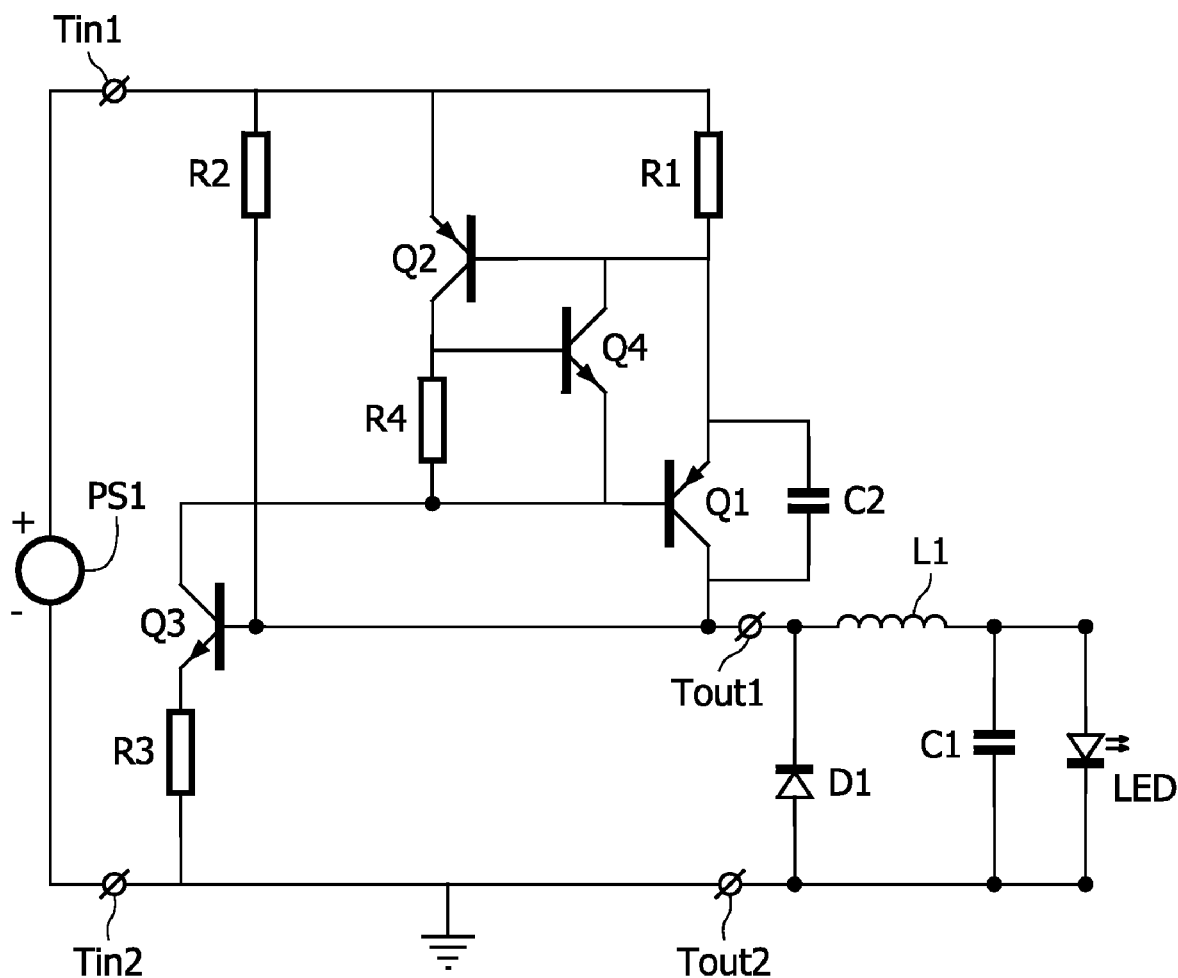
FIG. 2 shows a circuit diagram of a first embodiment of a self-oscillating switching DC-DC converter according to the present invention.

In accordance with an embodiment of the present invention as illustrated in FIG. 2, a gain semi-conductor device, in particular a gain transistor Q4, may be provided to amplify the control signal applied by the first control transistor Q2 to the power switch transistor Q1. The gain transistor Q4 is with its collector connected to the base terminal of the first control transistor Q2, with its base terminal connected to the collector of the first control transistor Q2 and with its emitter connected to the base terminal of the power switch transistor Q1. It is noted that in another embodiment, the collector of the gain transistor Q4 may be connected to the positive terminal of the power supply PS. A gain resistor is introduced between the base terminal of the gain transistor Q4 (and thereby the collector of the first control transistor Q2) and the base terminal of the power switch transistor Q1. Additionally, a delay capacitor C2 is coupled between the emitter (power-switch input terminal) of the power switch transistor Q1 and the collector (power-switch output terminal) of the power switch transistor Q1. Apart from the above-mentioned added components, the circuit as illustrated in FIG. 2 is the same as the circuit as illustrated in FIG. 1.

In operation, the circuit of FIG. 2 operates similar to the circuit of FIG. 1. However, when the voltage over the sensing resistor R1 has become sufficiently high such that the first control transistor Q2 starts to conduct, the control signal output at the collector of the first control transistor Q2 is amplified by the gain transistor Q4. Thus, a small control signal output by the first control transistor Q2 becomes rapidly a relatively large control signal output by the gain transistor Q4. Consequently, due to the rapidly increasing control signal, the power switch transistor Q1 relatively rapidly switches to a non-conductive state. Thus, the power dissipation during switching is relatively low.

The delay capacitor C2 is as well operative to lower the power dissipation in the power switch transistor Q1. In particular when the power switch transistor Q1 is switched conductive, the delay capacitor C2 keeps the voltage across the collector and emitter of the power switch transistor Q1 relatively low. Consequently, the power dissipation, being equal to the current multiplied by the voltage, is low, since the voltage is low.

Figure 3:
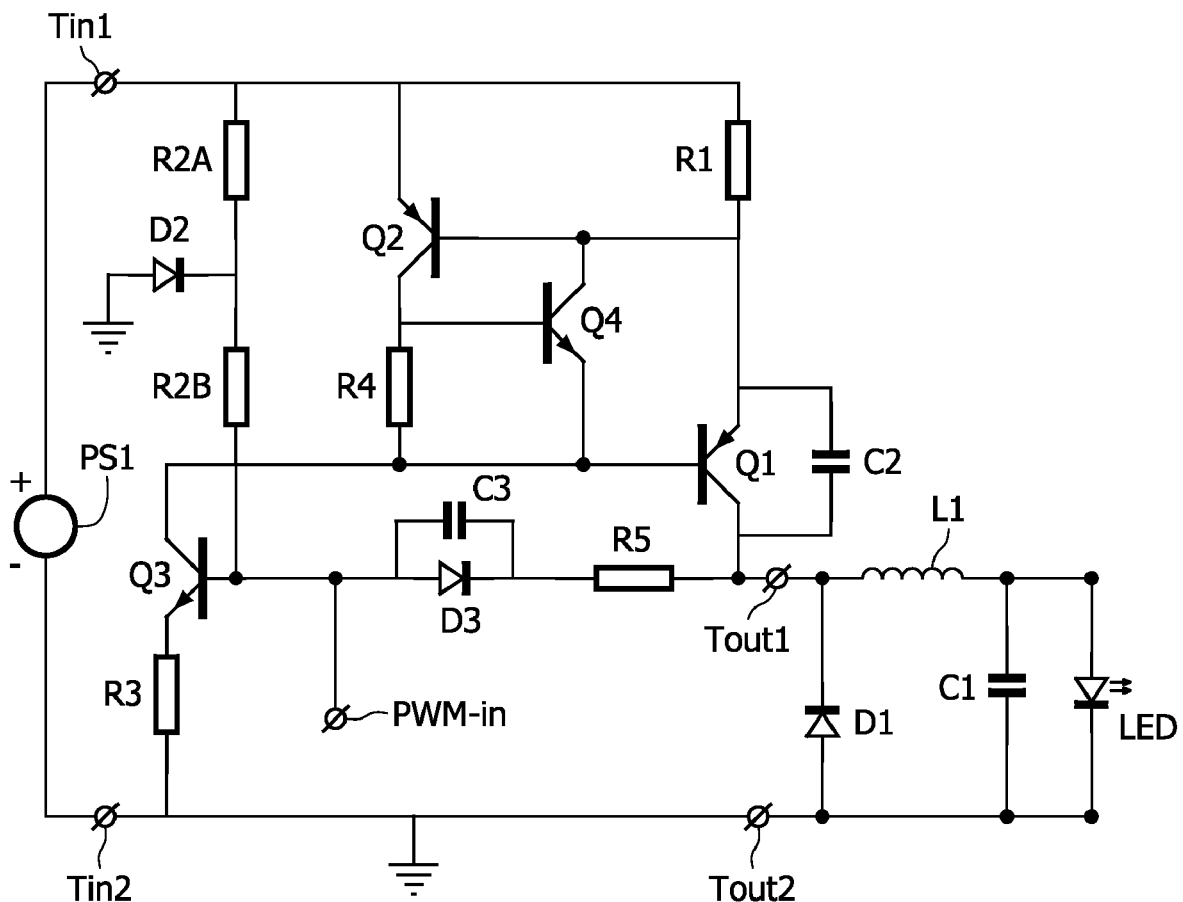
FIG. 3 shows a circuit diagram of a second embodiment of a self-oscillating switching DC-DC converter according to the present invention.

Referring to FIG. 3, the circuit as presented in FIG. 1 and FIG. 2 may be configured to be enabled for pulse width modulation (PWM) operation for dimming the LED. So, it is noted that the PWM operation and corresponding circuit changes may also be applied to the circuit of FIG. 1, thereby omitting the additional circuit components as introduced in FIG. 2.

In the circuit according to FIG. 3, a PWM signal input terminal PWM-in is coupled to the base terminal of the second control transistor Q3. Between the PWM signal input terminal PWM-in and the first output terminal Tout1 corresponding to the collector of the power switch transistor Q1, a series connection of a resistor R5 and a parallel circuit of a diode D3 and a feed forward capacitor C3 is provided. The diode D3 is provided to prevent that the load current coming from the power switch transistor Q1 may flow through the PWM signal input terminal PWM-in to the common terminal, since the PWM signal input terminal PWM-in may be coupled through a buffer transistor to the common terminal, as is explained in more detail hereinafter with reference to FIG. 4.

Referring to FIG. 3, in operation, a suitable feedback coupling between the cathode of the freewheel diode D1 and the base terminal of the second control transistor Q3 is required for correct operation of the circuit as is explained in relation to FIG. 1. Such a suitable coupling is provided by the resistor R5 and the feed forward capacitor C3. In particular, when the power switch transistor Q1 starts to conduct again, the feedback capacitor C3 increases the base current of the second control transistor Q3, whereas the feedback resistor R5 limits said base current and ensures a proper start-up of the circuit.

Still referring to FIG. 3, the start-up resistor is now embodied as a series connection of a first start-up resistor R2A and a second start-up resistor R2B. At a node between the first and the second start-up resistors R2A, R2B a zener diode D2 is coupled. The zener diode D2 is further coupled to ground (common terminal). This start-up circuit keeps a level of a DC current through the power switch transistor Q1 relatively low within a power supply voltage range and within an operating temperature range.

Figure 4:
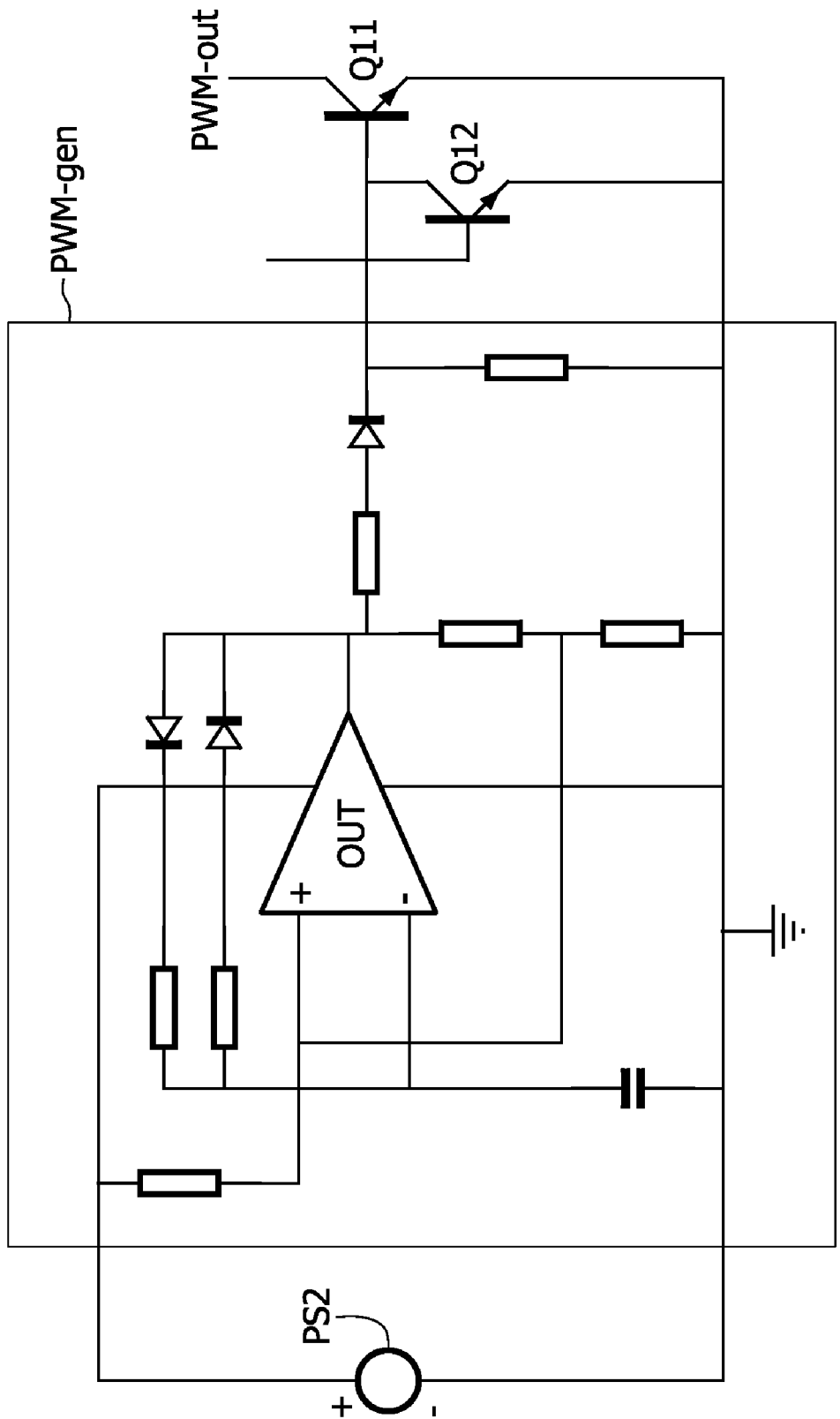
FIG. 4 shows an embodiment of a PWM generator circuit for use with the switching DC-DC converter according to FIG. 3.

FIG. 4 shows a known PWM signal generator PWM-gen. The PWM signal generator PWM-gen is suitable to be used in combination with the self-oscillating switch circuit as illustrated in FIG. 3. However, other PWM signal generators may be employed. Therefore, a detailed discussion of the PWM signal generator PWM-gen is omitted here. The PWM signal generator PWM-gen is coupled to a power supply PS2, which may be the same power supply as presented in FIGS. 1-3 (power supply PS1), or may be any other separate suitable power supply PS2.

A PWM signal generated by the PWM signal generator PWM-gen is applied to a control terminal of a buffer semiconductor device, in particular a base terminal of a buffer transistor Q11. The collector of the buffer transistor Q11 is operative as a PWM signal output terminal PWM-out and may be coupled to the PWM signal input terminal PWM-in of the circuit of FIG. 3. The emitter of the buffer transistor Q11 is coupled to ground (or a common terminal).

Further, a controllable switch element, in particular a bipolar switch transistor Q12 is coupled between the base terminal of the buffer transistor Q11 and ground such that when a PWM interruption signal is applied to a control terminal, i.e. a base terminal of the switch transistor Q12, the base terminal of the buffer transistor Q11 is connected to ground, thereby switching the buffer transistor non-conductive, resulting in disabling the PWM signal.

Now referring to FIGS. 3 and 4, in PWM operation, the output of the PWM signal generator PWM-gen is applied to the base terminal of the buffer transistor Q11. When the buffer transistor Q11 is switched conductive, the PWM signal input terminal PWM-in of the self-oscillating switch circuit is connected to ground (common terminal). As a result, the second control transistor Q3 is switched non-conductive and the power switch transistor Q1 is also switched non-conductive. Thus, the oscillation of the self-oscillating circuit is interrupted. If the buffer transistor Q11 is switched non-conductive, the self-oscillating switch circuit operates as described in relation to FIG. 1 and FIG. 2.

When the PWM interruption signal is applied to the base terminal of the switch transistor Q12, the buffer transistor Q11 is switched non-conductive, as mentioned above, and consequently, the PWM signal is interrupted independent of the output of the PWM signal generator PWM-gen. Such a PWM interruption signal may be used for rear combination lights (RCL) in automotive applications. For example, the PWM signal generator PWM-gen may output a PWM signal having a duty cycle of about 90%, resulting in the LED emitting light during about 10% of the time (inverting circuit), which may be suitable as a tail light of a car. When breaking, the same LED may be used by interrupting the PWM signal, effectively resulting in a 100% duty cycle and thus a higher light intensity output by the LED, which is suitable as a break light.

Although detailed embodiments of the present invention are disclosed herein, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Further, the terms and phrases used herein are not intended to be limiting; but rather, to provide an understandable description of the invention. The terms "a" or "an", as used herein, are defined as one or more than one. The term another, as used herein, is defined as at least a second or more. The terms including and/or having, as used herein, are defined as comprising (i.e., open language). The term coupled, as used herein, is defined as connected, although not necessarily directly, and not necessarily by means of wires.

The invention claimed is:

1. A self-oscillating switch circuit for use in a switching DC-DC converter, the self-oscillating switch circuit comprising:
    an input terminal for receiving power from a power supply;
    an output terminal for supplying power to a load;
    a power switch semi-conductor device having a control terminal, the power switch semi-conductor device being configured for controlling a load current between the input terminal and the output terminal;
    a control semi-conductor device coupled to the power switch semi-conductor device for supplying a control signal to the control terminal of the power switch semi-conductor device for controlling switching of the power switch semi-conductor device;
    a gain semi-conductor device coupled between the power switch semi-conductor device and the control semi-conductor device for amplifying the control signal.

2. The self-oscillating switch circuit of claim 1, wherein the load current flows through the power switch semi-conductor device from a power-switch input terminal to a power-switch output terminal and wherein a capacitor is coupled between said power-switch input terminal and said power-switch output terminal.

3. The self-oscillating switching circuit of claim 1, wherein the control semi-conductor device is configured to cause the power switch semi-conductor device to be conductive when the control semi-conductor device is turned on so that a current passes through the control semi-conductor device.

4. The self-oscillating switch circuit of claim 1, wherein a start-up circuit is coupled between the input terminal and the control terminal of the control semi-conductor device, the start-up circuit comprising a Zener diode and being coupled to the control semiconductor.

5. The self-oscillating switching circuit of claim 1, wherein the control semi-conductor device is a first control semi-conductor device for switching the power switch semi-conductor device to be non-conductive, and wherein the self-oscillating switch circuit further comprises a second control semi-conductor device coupled to the control terminal of the power switch semi-conductor device for switching the power switch semi-conductor device to be conductive.

6. The self-oscillating switching circuit of claim 5, further comprising a current feedback resistor connected in series with the power switch semi-conductor device between the input terminal and the output terminal, wherein a voltage across the current feedback resistor turns on the first control semi-conductor device causing the first control semi-conductor device to switch the power switch semi-conductor device to be non-conductive.

7. The self-oscillating switching circuit of claim 1, further comprising a current feedback resistor connected in series with the power switch semi-conductor device between the input terminal and the output terminal, wherein a voltage across the current feedback resistor turns on the control semi-conductor device causing the control semi-conductor device to switch the power switch semi-conductor device to be non-conductive.

8. The self-oscillating switching circuit of claim 7, wherein the current feedback resistor is connected across a base-emitter junction of the control semi-conductor device and causes the power switch semi-conductor device to be non-conductive when a voltage produced by the current through the resistor reaches a threshold voltage of the control semi-conductor device.

9. The self-oscillating switch circuit of claim 1, wherein at least one of the power switch semi-conductor device, the control semi-conductor device and the gain semi-conductor device is a transistor.

10. The self-oscillating switch circuit of claim 9, wherein the at least one of the power switch semi-conductor device, the control semi-conductor device and the gain semi-conductor device is a bipolar transistor.

11. The self-oscillating switch circuit of claim 9, wherein the at least one of the power switch semi-conductor device, the control semi-conductor device and the gain semi-conductor device is a field-effect transistor, FET.

12. A load driver circuit for operating a load, the load driver circuit comprising a switching DC-DC converter circuit, the switching DC-DC converter comprising a self-oscillating switch circuit according to claim 1.

13. The load driver circuit of claim 12, wherein the switching DC-DC converter is selected from a group comprising a buck converter, a boost converter, a buck-boost converter and a flyback converter.

14. The load driver circuit of claim 12, wherein the load is a light emitting diode, LED.

15. A self-oscillating switch circuit for use in a switching DC-DC converter, the self-oscillating switch circuit comprising:
    an input terminal for receiving power from a power supply;
    an output terminal for supplying power to a load;
    a power switch semi-conductor device having a control terminal, the power switch semi-conductor device being configured for controlling a load current between the input terminal and the output terminal;
    a first control semi-conductor device coupled to the power switch semi-conductor device for supplying a control signal to the control terminal of the power switch semi-conductor device for controlling switching of the power switch semi-conductor device to be non-conductive;
    a gain semi-conductor device coupled between the power switch semi-conductor device and the first control semi-conductor device for amplifying the control signal;
    a second control semi-conductor device coupled to the control terminal of the power switch semi-conductor device for switching the power switch semi-conductor device to be conductive; and
    a pulse width modulation (PWM) circuit coupled between the power switch semi-conductor device and the second control semi-conductor device, the PWM circuit comprising a PWM signal input terminal for receiving a PWM signal.

16. The self-oscillating switch circuit of claim 15, wherein the PWM circuit comprises a series connection of a PWM circuit resistor and a parallel connection of a PWM circuit capacitor and a PWM circuit diode, wherein the PWM circuit capacitor is configured for increasing a control signal supplied to the second control semi-conductor device, when the power switch semi-conductor device starts to conduct.

17. The self-oscillating switch circuit of claim 15, wherein a start-up circuit is coupled between the input terminal and the control terminal of the second control semi-conductor device, the start-up circuit comprising a Zener diode and being coupled to the second control semiconductor.

18. The self-oscillating switch circuit of claim 15, wherein a PWM signal generator is coupled to a control terminal of a buffer semi-conductor device, the buffer semi-conductor device being coupled between the PWM signal input terminal and a common terminal.

19. The self-oscillating switch circuit of claim 18, wherein a controllable switch element is coupled between the control terminal of the buffer semi-conductor device and the common terminal such that the buffer semi-conductor device is switched non-conductive, when the controllable switch element is switched conductive for disabling the PWM signal.

* * * * *